US011603766B1

(12) United States Patent
Tremblay et al.

(10) Patent No.: US 11,603,766 B1
(45) Date of Patent: Mar. 14, 2023

(54) TURBINE STATOR VANES HAVING INSERTS AND SPLITTER PLATES

(71) Applicant: PRATT &WHITNEY CANADA CORP., Longueuil (CA)

(72) Inventors: Christophe Tremblay, Boucherville (CA); Patricia Phutthavong, St-Phillippe (CA); Farzad Ashrafi, La Prairie (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/662,005

(22) Filed: May 4, 2022

(51) Int. Cl.
*F01D 5/18* (2006.01)
*F01D 11/24* (2006.01)
*F01D 9/06* (2006.01)

(52) U.S. Cl.
CPC ............ *F01D 5/188* (2013.01); *F01D 5/189* (2013.01); *F01D 9/065* (2013.01); *F01D 11/24* (2013.01); *F05D 2240/121* (2013.01); *F05D 2240/122* (2013.01); *F05D 2240/35* (2013.01); *F05D 2260/201* (2013.01)

(58) Field of Classification Search
CPC .......... F01D 5/188; F01D 5/189; F01D 5/186; F01D 9/065; F05D 2260/201; F05D 2260/20; F05D 2260/202
USPC ...................................................... 416/96 A
See application file for complete search history.

(56) References Cited

U.S. PATENT DOCUMENTS

| 2,847,185 | A | * | 8/1958 | Petrie et al. | ............ | F01D 9/042 |
| | | | | | | 415/115 |
| 6,733,233 | B2 | * | 5/2004 | Jasklowski | ........... | F01D 11/025 |
| | | | | | | 415/173.3 |
| 8,043,057 | B1 | * | 10/2011 | Liang | ..................... | F01D 9/041 |
| | | | | | | 416/96 A |
| 9,523,283 | B2 | | 12/2016 | Uechi et al. | | |
| 2018/0258790 | A1 | * | 9/2018 | Jain | ......................... | F02C 3/107 |

FOREIGN PATENT DOCUMENTS

GB          1068280          5/1967

* cited by examiner

*Primary Examiner* — Christopher Verdier
(74) *Attorney, Agent, or Firm* — Norton Rose Fulbright Canada LLP

(57) ABSTRACT

A stator of a turbine section, has: vanes distributed around a central axis, a vane of the vanes extending along a spanwise axis and defining an internal passage; an insert received within the internal passage, the insert defining a cavity for receiving cooling air and defining impingement cooling apertures facing an inner face of the vane; a splitter plate secured within the cavity and being transverse to the spanwise axis, the splitter plate having a base secured to the insert and a tip protruding from the base; and a flow passage defined between the tip and the insert, the flow passage fluidly connecting a first section of the cavity to a second section of the cavity, the tip of the splitter plate secured to the insert at at least one location along a perimeter of the tip.

20 Claims, 5 Drawing Sheets

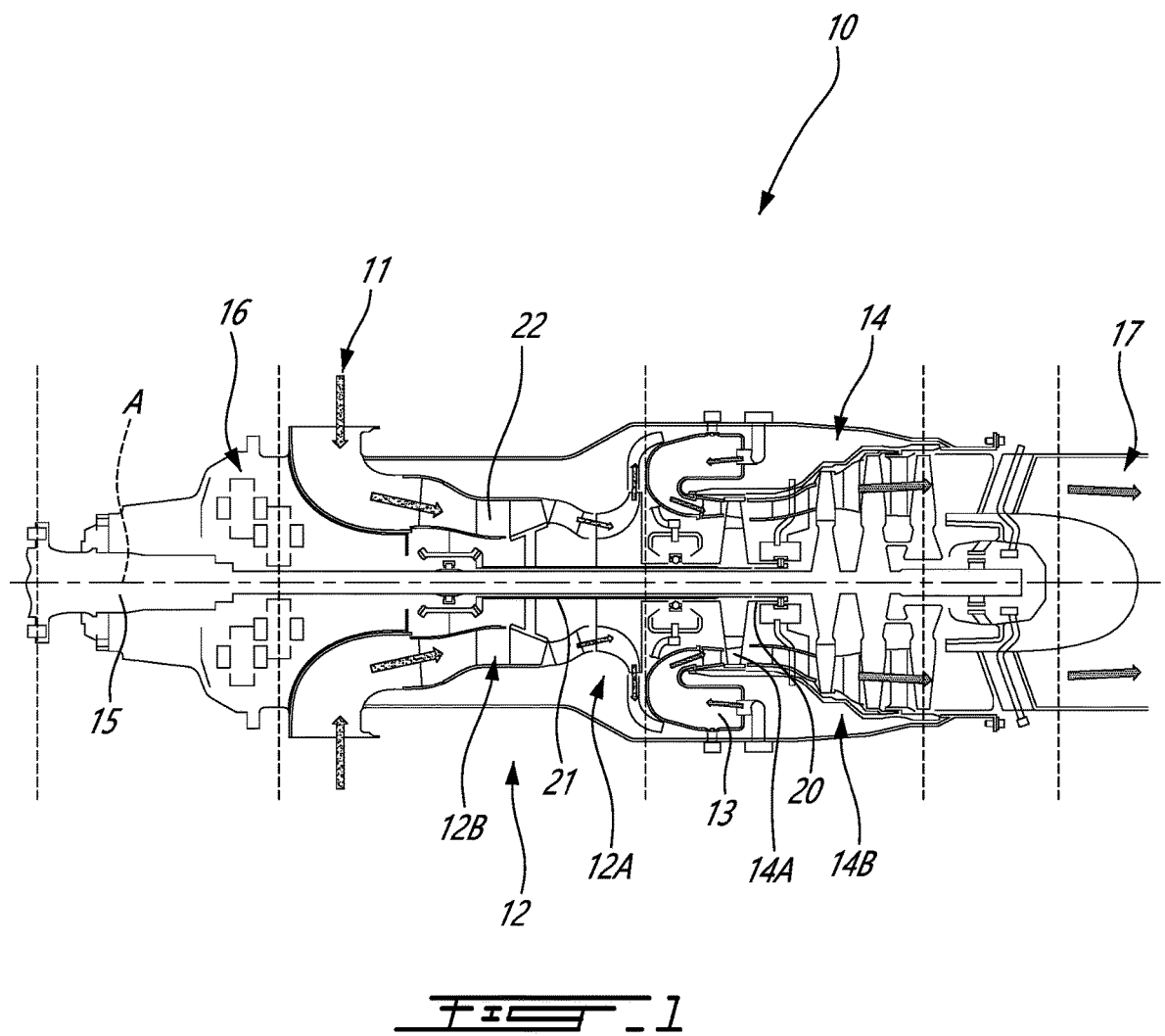
FIG_1

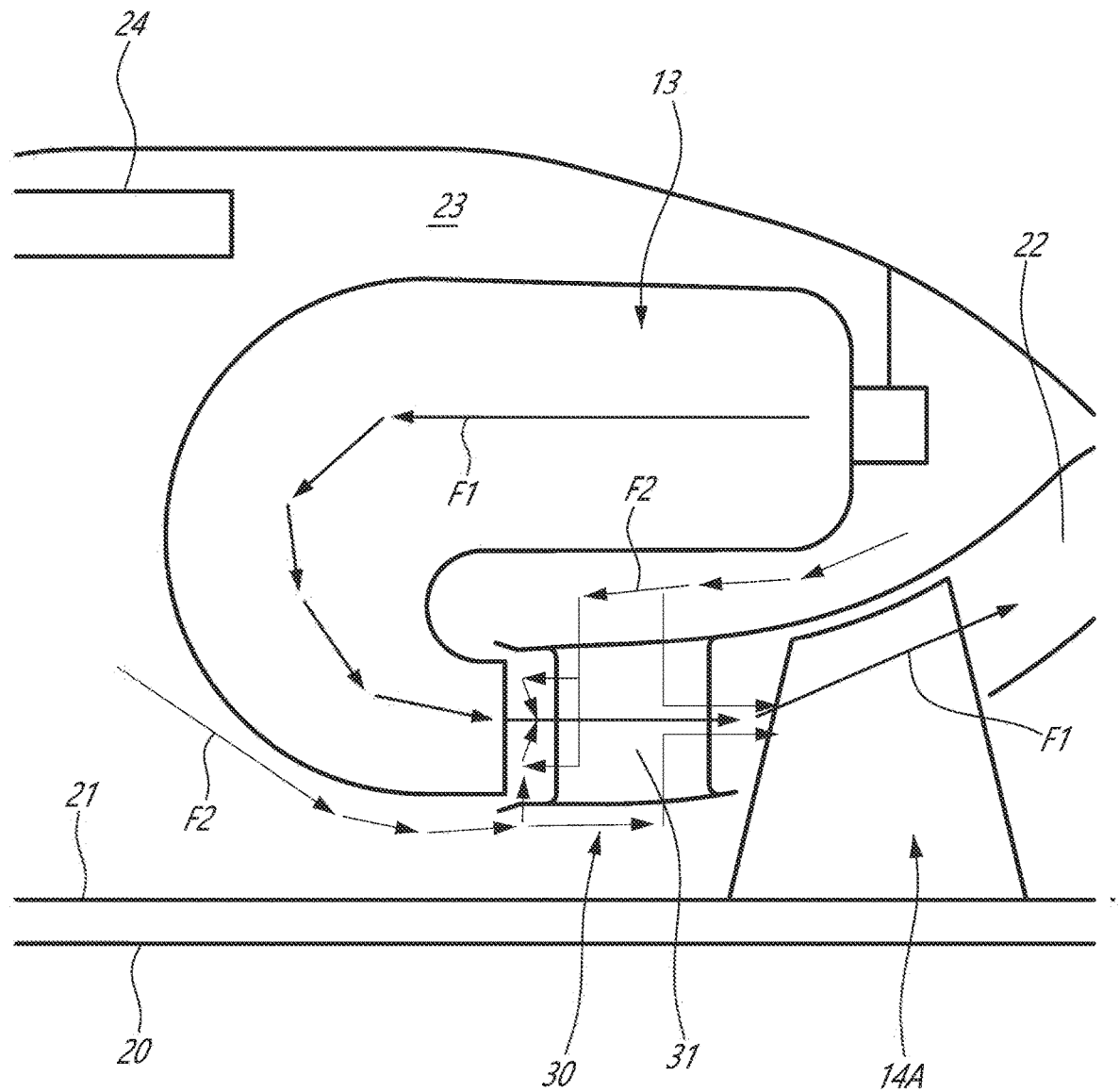

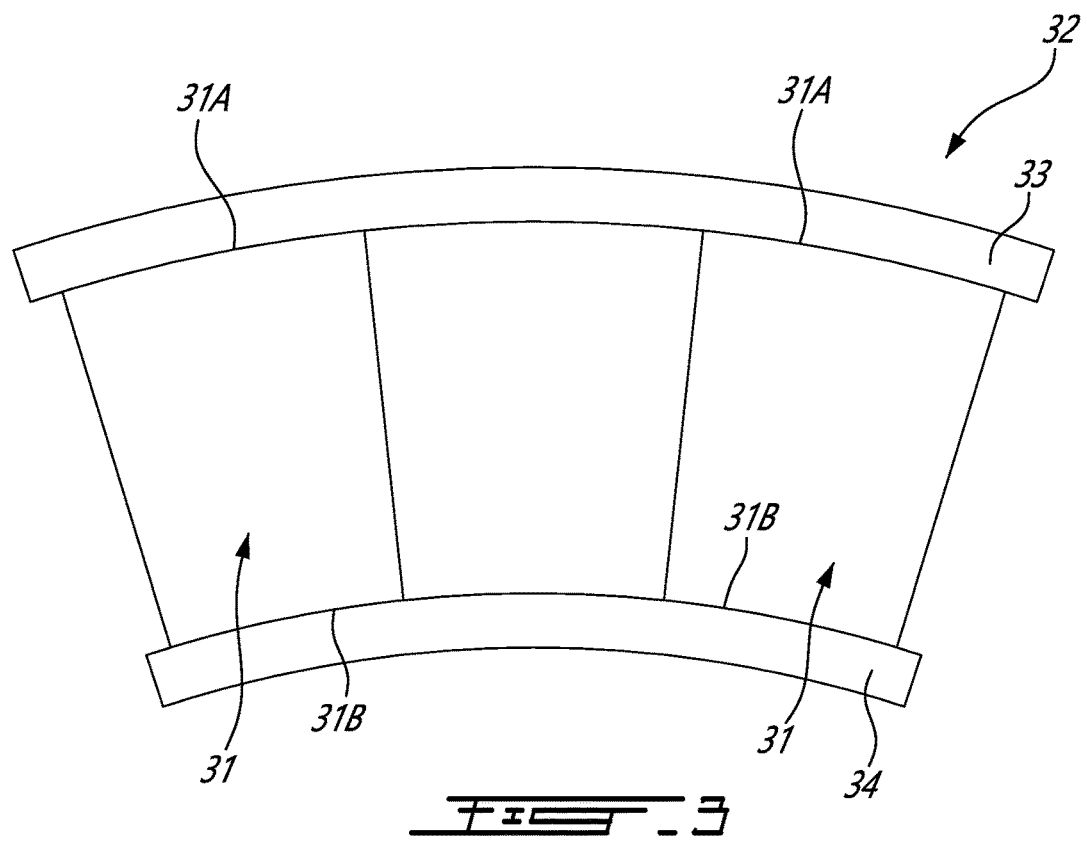
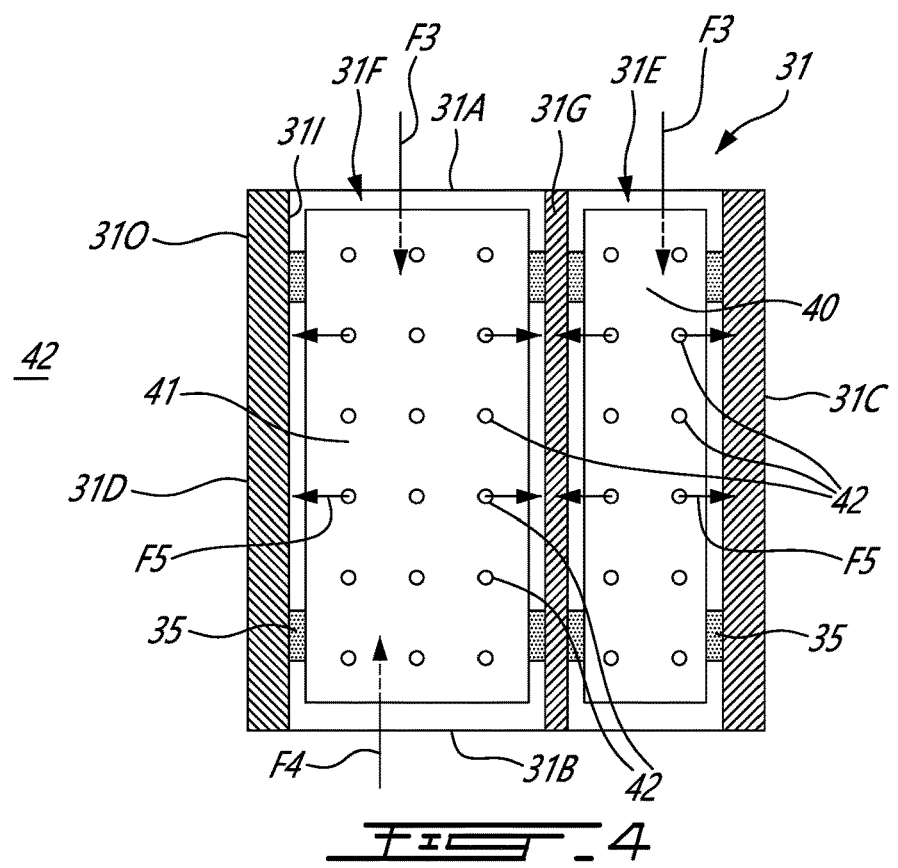

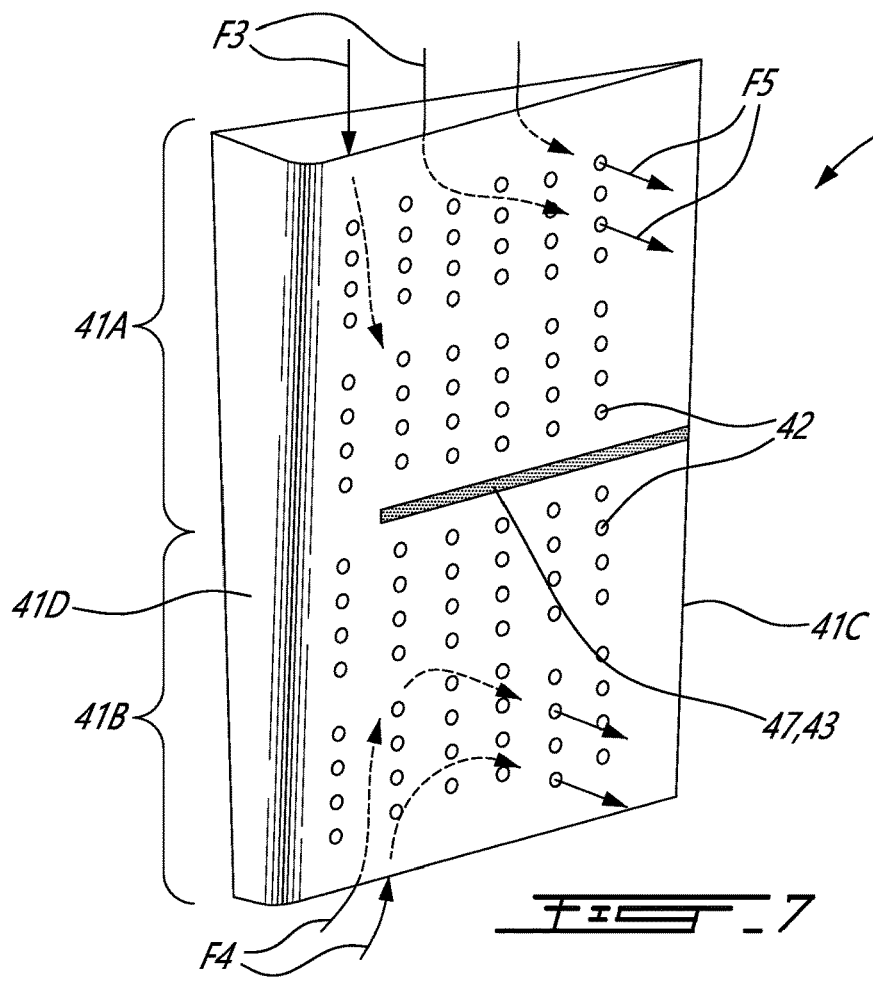
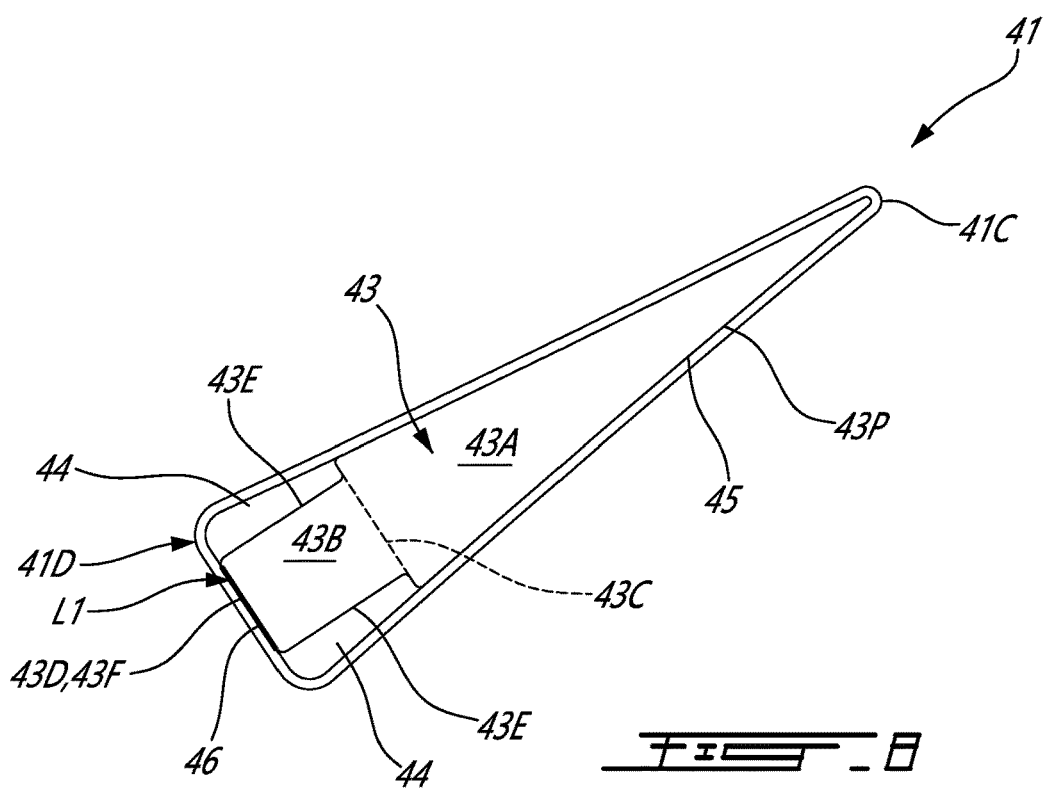

TURBINE STATOR VANES HAVING INSERTS AND SPLITTER PLATES

TECHNICAL FIELD

The application relates generally to aircraft engines and, more particularly, to turbine sections of such engines and to systems for cooling stator vanes of turbine sections.

BACKGROUND

Aircraft engines, such as gas turbine engines, use compressed air from the compressor section for cooling components of the turbine section. This compressed air may be channeled within cavities defined by stator vanes of the turbine section. In some cases, this air may flow in an undesired manner. Improvements are therefore sought.

SUMMARY

In one aspect, there is provided a stator of a turbine section, comprising: vanes circumferentially distributed around a central axis, a vane of the vanes extending along a spanwise axis from a first end to a second end, the vane defining an internal passage extending from the first end to the second end; an insert received within the internal passage of the vane, the insert defining a cavity for receiving cooling air, the insert defining impingement cooling apertures in fluid communication with the cavity and facing an inner face of the vane; a splitter plate secured within the cavity of the insert between the first end and the second end and being transverse to the spanwise axis, the splitter plate having a base secured to the insert and a tip protruding from the base; and a flow passage defined between the tip of the splitter plate and the insert, the flow passage fluidly connecting a first section of the cavity located on a first side of the splitter plate to a second section of the cavity located on a second side of the splitter plate, the tip of the splitter plate secured to the insert at at least one location along a perimeter of the tip.

The stator described above may include any of the following features, in any combinations.

In some embodiments, the tip extends from a proximal end at the base to a distal end, the distal end secured to the insert.

In some embodiments, the insert includes a rear end proximate a trailing edge of the vane and a fore end, the at least one location corresponding to the fore end.

In some embodiments, the flow passage includes two flow passages.

In some embodiments, the two flow passages are located on opposite sides of the tip.

In some embodiments, the splitter plate is free of a cantilevered section.

In some embodiments, a perimeter of the base is secured to the insert via a braze joint.

In some embodiments, the insert includes a rear end proximate a trailing edge of the vane and a fore end, the insert defining a slit extending from the rear end toward a front end of the insert, the splitter plate received within the slit.

In some embodiments, the insert includes a portion free of the slit, the portion extending from the front end towards the rear end, the flow passage defined between the portion of the insert and the tip of the insert.

In some embodiments, a braze joint is at the at least one location where the tip is secured to the insert.

In another aspect, there is provided a turbine section, comprising; stators and rotors in fluid flow communication with the stators, a stator of the stators having: vanes circumferentially distributed around a central axis, a vane of the vanes extending along a spanwise axis from a first end to a second end, the vane defining an internal passage extending from the first end to the second end, an insert received within the internal passage of the vane, the insert defining a cavity for receiving cooling air, the insert defining impingement cooling apertures in fluid communication with the cavity and facing an inner face of the vane, and a splitter plate secured within the cavity of the insert between the first end and the second end and being transverse to the spanwise axis, the splitter plate having a base abutting the insert and a tip protruding from the base, the tip defining: a free portion free of abutment with the insert to define a flow passage between the free portion and the insert, the flow passage fluidly connecting a first section of the cavity located on a first side of the splitter plate to a second section of the cavity located on a second side of the splitter plate, and an attached portion having a perimeter secured to the insert at at least one location.

The turbine section described above may include any of the following features, in any combinations.

In some embodiments, the tip extends from a proximal end at the base to a distal end, the attached portion corresponding to the distal end.

In some embodiments, the insert include a rear end proximate a trailing edge of the vane and a fore end, the attached portion secured to the fore end.

In some embodiments, the flow passage includes two flow passages.

In some embodiments, the two flow passages are located on opposite sides of the tip.

In some embodiments, the splitter plate is free of a cantilevered section.

In some embodiments, a perimeter of the base is secured to the insert via a braze joint.

In some embodiments, the insert includes a rear end proximate a trailing edge of the vane and a fore end, the insert defining a slit extending from the rear end toward a front end of the insert, the splitter plate received within the slit.

In some embodiments, the insert includes a portion free of the slit, the portion extending from the front end of the insert towards the rear end, the flow passage defined between the portion of the insert and the tip of the insert.

In some embodiments, a braze joint is between the attached portion and the insert at the at least one location.

BRIEF DESCRIPTION OF THE DRAWINGS

Reference is now made to the accompanying figures in which:

FIG. 1 is a schematic cross-section view of an aircraft engine depicted as a gas turbine engine;

FIG. 2 is a cross-section view of a combustor and a stator of a turbine section of the gas turbine engine of FIG. 1;

FIG. 3 is a front view of a portion of the stator of FIG. 2;

FIG. 4 is a cross-section view of a vane of the stator of FIG. 3;

FIG. 7 is a three dimensional view of an insert for the stator of FIG. 3, the insert having a splitter plate inserted therein through a slot at mid-span between opposed ends of the vane; and FIG. 8 is top cross-section view of the insert of FIG. 7 illustrating a splitter plate received within the insert of FIG. 7.

DETAILED DESCRIPTION

Figure 5:
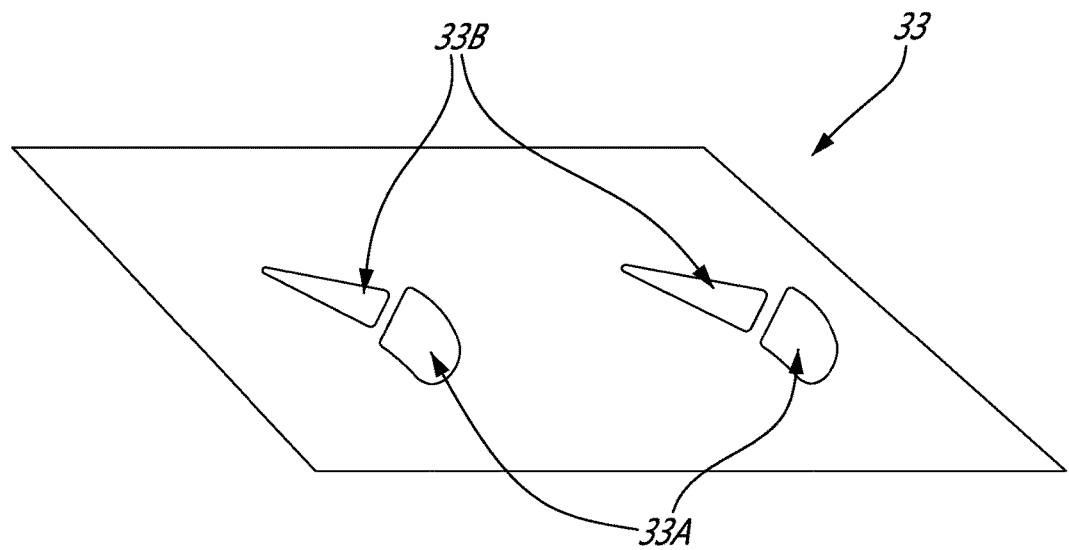
FIG. 5 is a plan view of an outer wall of the stator of FIG. 3.

FIG. 1 illustrates a gas turbine engine 10 of a type preferably provided for use in subsonic flight, generally comprising in serial flow communication an inlet 11 receiving ambient air, a compressor section 12 for pressurizing the air, a combustor 13 in which the compressed air is mixed with fuel and ignited for generating an annular stream of hot combustion gases, a turbine section 14 for extracting energy from the combustion gases and for driving the compressor section 12 and for driving an output shaft 15 via a gearbox 16, and an outlet 17 for outputting combustion gases. The compressor section 12 and the turbine section 18 are rotatable about a central axis A of the gas turbine engine 10.

In the embodiment shown, the gas turbine engine 10 comprises a high-pressure spool having a high-pressure shaft 20 drivingly engaging a high-pressure turbine 14A of the turbine section 14 to a high-pressure compressor 12A of the compressor section 12, and a low-pressure spool having a low-pressure shaft 21 drivingly engaging a low-pressure turbine 14B of the turbine section 14 to a low-pressure compressor 12B of the compressor section 12 and drivingly engaged to the output shaft 15, herein via the gearbox 16. It will be understood that the contents of the present disclosure may be applicable to any suitable engines, such as turbofans, turboshafts, auxiliary power units, and hybrid aircraft engines without departing from the scope of the present disclosure.

The term "spool" is herein intended to broadly refer to drivingly-connected turbine and compressor rotors and is, thus, not limited to a compressor and turbine assembly on a single shaft. It also includes a rotary assembly with multiple shafts geared together.

Referring to FIG. 2, the turbine section 14 includes a stator 30 upstream of a rotor of the high-pressure turbine 14A relative to a flow direction F1 within a core gaspath 22 of the gas turbine engine 10. This stator 30 includes a plurality of stator vanes, referred to simply as vanes 31 below, circumferentially distributed about the central axis A for orienting the flow of combustion gases before it meets blades of the rotor of the high-pressure turbine 14A. The stator 30 may be located immediately downstream of the combustor 13. The principles of the present disclosure may apply to any stator of the turbine section 14.

The vanes 31 are hollow and internally cooled using cooling air, such as air from the compressor section 12. More specifically, a plenum 23 surrounds the combustor 13. This plenum 23 may be annular and is in fluid communication with an outlet of the high-pressure compressor 12A. The high-pressure compressor 12A may be an impeller having an outlet in fluid communication with diffuser pipes 24. These diffuser pipes 24 may deliver the flow of compressed air in the plenum 23. A portion of this flow of compressed air may flow around the combustor 13 along a cooling flow direction F2. This portion may thus flow through inner passages defined by the vanes 31.

Referring to FIG. 3, a portion of the stator 30 is shown. In the embodiment shown, the stator 30 includes a plurality of vane segments 32 circumferentially distributed around the central axis A. The stator 30 is therefore a segmented ring. In some embodiments, the turbine stator may be a full ring. One of the vane segments 32 is shown in FIG. 3 and includes some of the vanes 31, herein two, but each vane segments 32 may include more or less than two vanes 31. The vane segments 32 includes a radially outer wall 33 and a radially inner wall 34. The vanes 31 extend from the radially outer wall 33 to the radially inner wall 34. Each of the vane segments 32 may be a monolithic body defining the radially outer wall 33, the radially inner wall 34, and some (e.g. 2) of the vanes 31. Other configurations are contemplated as well.

Referring to FIG. 4, the vanes 31 are described in greater detail. The singular form is used below for simplicity, but the below description may apply to each of the vanes 31. The vane 31 has a radially outer end 31A secured to the outer wall 33 and a radially inner end 31B secured to the inner wall 34. The vane 31 has a leading edge 31C and a trailing edge 31D downstream of the leading edge 31C relative to a flow in the core gaspath 22. The vane 31 is hollow and includes a front internal passage 31E and a rear internal passage 31F separated from the front internal passage 31E by a rib 31G that extends within the vane 31 from the outer end 31A to the inner end 31B. The front internal passage 31E and the rear internal passage 31F may extend from the radially outer end 31A to the radially inner end 31B of the vane 31.

A front insert 40 is received within the front internal passage 31E, and a rear insert 41 is received within the rear internal passage 31F. The front, and rear inserts 40, 41 are hollow to receive the cooling air, and define impingement cooling apertures 42 extending through walls of the inserts 40, 41. In other words, the front and rear inserts 40, 41 define cavities for receiving the cooling air. The impingement cooling apertures 42 are designed to output the flow of cooling air from internal passages of the front and rear inserts 40, 41 and to direct this flow of cooling air in the form of impingement jets against the inner faces 31I (i.e. the wall surfaces bounding the hollow interior of the vanes) of the vanes 31. In other words, the impingement cooling apertures 42 face the inner faces 31I of the vanes 31. By doing so, heat that is transferred from the combustion gases to outer faces 31O of the vanes 31, and by conduction from the outer faces 31O to the inner faces 31I, may be at least partially transferred by convection to the air that exits the impingement cooling apertures 42 of the inserts 40, 41 and that impinges the inner faces 31I of the vanes 31.

Posts or spacers 35 may be disposed between the inner faces 31I and the inserts 40, 41 to maintain adequate spacing between the inner faces 31I of the vanes 31 and the inserts 40, 41 to allow the air to exit the internal passages of the inserts 40, 41 and to impinge on the vanes 31. These spacers 35 may be secured to the vanes 31 and/or to the inserts 40, 41.

Figure 6:
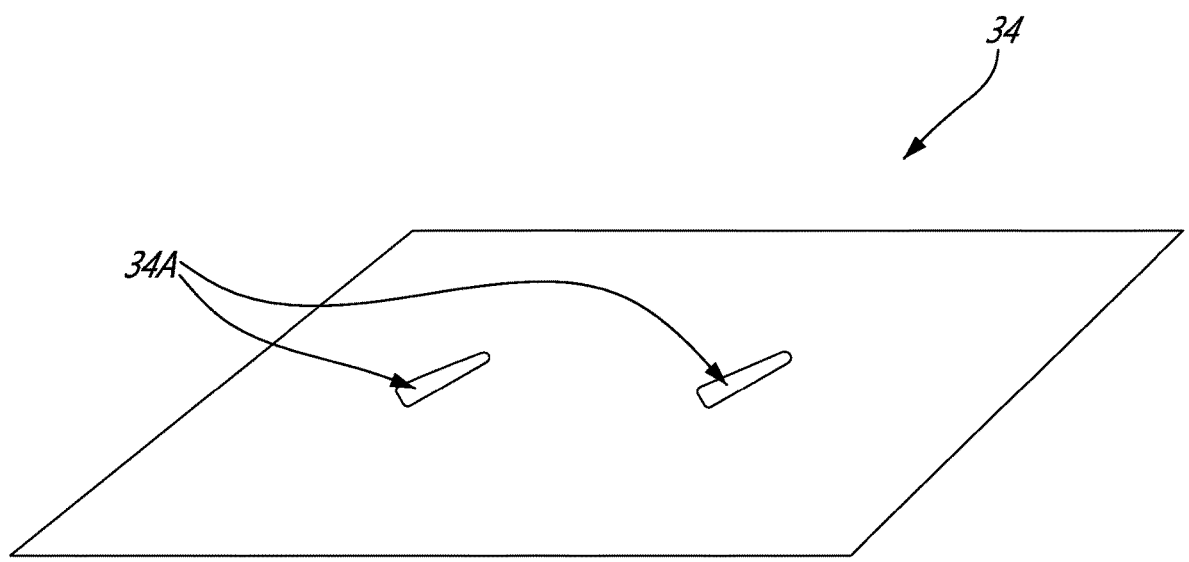
FIG. 6 is a plan view of an inner wall of the stator of FIG. 3.

Referring to FIG. 5, the outer wall 33 defines front outer apertures 33A for receiving the compressed air. These front outer apertures 33A are in registry and communicate with the front internal passages 31E of the vanes 31. The outer wall 33 further defines rear outer apertures 33B that are in registry and communicate with the rear internal passages 31F of the vanes 31. As shown in FIG. 6, the inner wall 34 defines rear inner apertures 34A for receiving the compressed air. These rear inner apertures 34A are in registry and communicate with the rear internal passages 31F of the vanes 31. In the embodiment shown, the inner wall 34 does not define front inner aperture. Thus, cooling air may be supplied to the front internal passage 31E of the vane 31 solely via the radially outer end 31A of the vane 31. In some other embodiments, the inner wall 34 may define front inner apertures.

As illustrated in FIGS. 2 and 4-6, cooling air is flown through the vanes 31 via both the radially outer and inner ends 31A, 31B of the vanes 31 via the rear outer and inner apertures 33B, 34A. As shown in FIG. 4, cooling air is flown inside the front and rear inserts 40, 41 via their radially-outer ends along flow direction F3 and flown inside the rear insert 41 via its radially-inner end along flow direction F4. This cooling air then flows through the impingement cooling apertures 42 defined by the rear inserts 41 received within the vanes 31. After exiting these impingement cooling apertures 42 along flow direction F5, the cooling air impinges on the inner faces 31I of the vanes 31 for impingement cooling. However, since the rear internal passages 31F of the vanes 31 are fed with cooling air via both of the outer ends 31A and inner ends 31B, care should be taken to ensure that this cooling air exits the rear inserts 41 via the impingement cooling apertures 42 rather than simply flow through the vanes 31. In some cases, the cooling air may experience more resistance by flowing through the impingement cooling apertures 42 compared than flowing across the vanes 31.

Referring now to FIG. 7, an example of one of the rear inserts 41 is illustrated and described below using the singular form. The below description may apply to all of the rear inserts 41. In the embodiment shown, the rear insert 41 defines a slit 47 that is sized to accept a splitter plate 43. The splitter plate 43 is secured within the cavity of the rear insert 41 between the radially outer end 31A and the radially inner end 31B of the vane 31 and is transverse to a spanwise axis of the vane 31. The splitter plate 43 may be located at a mid-span location of the rear insert 41, or at any other suitable spanwise location. The splitter plate 43 may be made of sheet metal. This splitter plate 43 is used to prevent the cooling air from flowing through the vane 31 and bypassing the impingement cooling apertures 42. With the splitter plate 43, a major portion the air (e.g., 50% or more) is forced to flow through the impingement cooling apertures 42 along the flow direction F5 (FIG. 4). The rear insert 41 and the splitter plate 43 may be cast, MIM, or 3D printed as a single monolithic part.

In the present embodiment, the slit 47 is used to allow the insertion of the splitter plate 43 within the rear insert 41. More specifically, in some embodiments, it may not be possible to insert the splitter plate 43 via the inner or outer ends of the rear insert 41 because of a varying cross-sectional area or shape of the rear insert 41. To insert the splitter plate 43 inside the rear insert 41, the slit 47 may be manufactured (e.g., machined). This slit 47 may extend from the rear end 41C of the rear insert 41 towards the fore end 41D. This slit 47 may not extend all the way to the fore end 41D. Thus, the rear insert 41 may include a portion free of the slit 47. This may avoid splitting the rear insert 41 in two parts. The splitter plate 43 may be inserted inside the rear insert 41 by being inserted inside this slit 47. The splitter plate 43 may thus be received within the slit 47. It will be appreciated that, in some other embodiments, the splitter plate 43 may be inserted within the rear insert 41 via one of the ends of the rear insert 41.

FIG. 8 represents a top cross-sectional view of the rear insert 41 taken along a plane normal to a spanwise axis of the vane 31 to illustrate the splitter plate 43 and to show how the splitter plate 43 is secured to the rear insert 41. As shown in FIG. 8, the rear insert 41 has a substantially triangular cross-section. Consequently, a width of the rear insert 41 increases from a rear end 41C to a fore end 41D. To be able to insert the splitter plate 43 inside the slit 47, a width of the tip 43B is less than a width of the rear insert 41 at the fore end 41D. More specifically, the width of the tip 43B is less than the width of the rear insert 41 at a location corresponding to where the slit 37 ends. This may ensure that there is no interference between the tip 43B of the splitter plate 43 and the rear insert 41 during the insertion of the splitter plate 43 within the slit 37. Other configurations are contemplated. In some embodiments, it may be possible to insert the splitter plate via one of the two ends 31A, 31B of the vane 31.

In the embodiment shown, the splitter plate 43 has a base 43A and a tip 43B protruding from the base 43A. A dashed line is shown in FIG. 8 to illustrate an intersection between the base 43A and the tip 43B. The base 43A is secured to the rear insert 41. In the present embodiment, the base 43A abuts against the insert 41. A perimeter 43P of the base 43A may be secured to the rear insert 41 via a braze joint 45. An entirety of the perimeter 43P of the base 43A may be secured to the rear insert 41. Alternatively, the base 43A may be secured at a plurality of discrete locations around the perimeter 43P of the base 43A. The tip 43B may start where a width of the splitter plate 43 defines a sudden decrease.

Referring to FIGS. 7-8, the splitter plate 43 is used to limit the cooling air from flowing from one of the ends of the vane 31 to the other. However, should one of the outer end 31A or the inner end 31B of the vane 31 become clogged, it may be desirable to maintain appropriate cooling air through the impingement cooling apertures 42. Consequently, at least one flow passage 44 (FIG. 8), two in the embodiment shown, are defined to fluidly connect inner and outer sections 41A, 41B of the cavity of the rear inserts 41. In the present embodiment, these flow passages 44 are defined between the tip 43B of the splitter plate 43 and the rear insert 41. These flow passages 44 may be a by-product of a shape of the splitter plate 43 required for its insertion within the insert 41 via the slit 47 as explained herein above. The flow passages 44 may be defined between the portion of the rear insert 41 that is free of the slit 47 and the tip 43B of the splitter plate 43. In the embodiment shown, the flow passages 44 include two flow passages 44 for each of the splitter plates 43. The two flow passages 44 may be located on opposite sides of the tip 43B. The flow passage(s) 44 fluidly connects the outer section 41A of the cavity of the insert 41, which is located on a first side of the splitter plate 43, to the inner section 41B of the cavity of the insert 41, which located on a second side of the splitter plate 43.

Therefore, air may flow past the splitter plate 43 via these flow passages 44. Therefore, if the outer end 31A of the vane 31 becomes clogged, cooling air may reach the impingement cooling apertures 42 defined within the outer section 41A of the rear insert 41 via the flow passages 44. Similarly, if the inner end 31B of the vane 31 becomes clogged, cooling air may reach the impingement cooling aperture 42 of the inner section 41B of the rear insert 41 via the flow passages 44. The outer section 41A of the rear insert 41 defines an outer cavity of the rear insert 41. The outer section 41A is in fluid flow communication with an outer group of the impingement cooling apertures 42. Similarly, the inner section 41B of the rear insert 41 define an inner cavity of the rear insert 41. The inner section 41B is in fluid flow communication with an inner group of the impingement cooling apertures 42. The flow passages(s) 44 may provide adequate fluid communication between the outer and inner cavities of the rear insert 41. Thus, should the inner end of the vane 31 or rear insert 41 become clogged or partially clogged, the inner group of the impingement cooling apertures 42 may receive cooling air from the outer section 41A of the rear insert 41 via the flow passage(s) 44. Similarly, should the outer end of the vane 31 or rear insert 41 becomes clogged or partially clogged, the outer group of the impingement cooling apertures 42 may receive cooling air from the inner section 41B of the rear insert 41 via the flow passage(s) 44.

In some embodiments, the cooling air flowing within the flow passages 44 between the outer section 41A and the inner section 41B of the rear insert 41 may induce vibrations of the tip 43B of the splitter plate 43. It may not be possible to simply increase a thickness of the splitter plate 43 because a thicker splitter plate may interfere with some of the impingement cooling apertures 42. In the present embodiment, to at least partially alleviate this issue, a perimeter of the tip 43B of the splitter plate 43 is secured to the rear insert 41 at at least one location L1. By securing the tip 43B of the splitter plate 43 as such vibrations and dynamic concerns may be at least partially addressed. The splitter plate 43 of the present embodiment may therefore be free of a cantilevered section because its perimeter is secured to the rear insert 41 at the at least one location L1.

In the embodiment shown, the tip 43B extends from a proximal end 43C at the base 43A to a distal end 43D. The distal end 43D may be secured to the rear insert 41. In the embodiment shown, the distal end 43D is secured to the rear insert 41 at the at least one location L1 via a brazed or weld joint 46. The rear end 41C of the rear insert 41 is proximate the trailing edge 31D of the vane 31 and the fore end 41D is proximate the rib 31G (FIG. 4). The at least one location L1 may be at the fore end 41D of the rear insert 41. The tip 43B of the splitter plate 43 may be free of attachment to the rear insert 41 at locations registering with the flow passages 44.

Put differently, the tip 43B of the splitter plate 43 has a perimeter that may define a free portion 43E being free of abutment with the rear inserts 41 to define the flow passages 44 between the free portion 43E of the perimeter of the tip 43B and the rear insert 41, and an attached portion 43F secured to the rear insert 41. In the present embodiment, the free portion 43E includes two free portions 43E each on opposite sides of the tip 43B and each facing a respective one of the two flow passages 44. The attached portion 43F may correspond to the distal end 43D of the tip 43B. An entirety of a perimeter of the distal end 43D of the tip 43B may be brazed to the rear insert 41. Alternatively, the perimeter of the distal end 43D of the tip 43B may be brazed to the rear insert 41 at one or more discrete locations separated from one another.

In some embodiments, the tip 43B of the splitter plate 43 may be secured at any suitable locations that may avoid undesired vibrations of the tip 43B. This may include one or more attachment points between the distal end 43D of the tip 43B and the rear insert 41; attachment points between lateral sides of the tip 43B and the rear insert 41 to decrease an effective length of a cantilevered portion of the tip 43B; and so on.

Securing the tip 43B of the splitter plate 43 as described herein may at least partially reduce the vibrations and dynamic issues of said splitter plate 43. The splitter plate 43 may therefore have a longer lifespan. The stator 30 may have improved performance.

The principles of the present disclosure may also apply to the front insert 40. In other words, the front insert 40 may, in some embodiments, require a front splitter plate, which may present the same characteristics of the splitter plate 43 described herein. The inserts 41 described herein may be replaced by two inserts being closed at one end, and welded in the vanes 31 to create two separate cavities instead of using a splitter plate. The splitter plates 43 may be at any suitable spanwise positions within the rear inserts 41.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A stator of a turbine section, comprising:
vanes circumferentially distributed around a central axis, a vane of the vanes extending along a spanwise axis from a first end to a second end, the vane defining an internal passage extending from the first end to the second end;
an insert received within the internal passage of the vane, the insert defining a cavity for receiving cooling air, the insert defining impingement cooling apertures in fluid communication with the cavity and facing an inner face of the vane;
a splitter plate secured within the cavity of the insert between the first end and the second end and being transverse to the spanwise axis, the splitter plate having a base secured to the insert and a tip protruding from the base; and
a flow passage defined between the tip of the splitter plate and the insert, the flow passage fluidly connecting a first section of the cavity located on a first side of the splitter plate to a second section of the cavity located on a second side of the splitter plate,
the tip of the splitter plate secured to the insert at at least one location along a perimeter of the tip.

2. The stator of claim 1, wherein the tip extends from a proximal end at the base to a distal end, the distal end secured to the insert.

3. The stator of claim 2, wherein the insert includes a rear end proximate a trailing edge of the vane and a fore end, the at least one location corresponding to the fore end.

4. The stator of claim 2, wherein the flow passage includes two flow passages.

5. The stator of claim 4, wherein the two flow passages are located on opposite sides of the tip.

6. The stator of claim 1, wherein the splitter plate is free of a cantilevered section.

7. The stator of claim 1, wherein a perimeter of the base is secured to the insert via a braze joint.

8. The stator of claim 7, wherein the insert includes a rear end proximate a trailing edge of the vane and a fore end, the insert defining a slit extending from the rear end toward a front end of the insert, the splitter plate received within the slit.

9. The stator of claim 8, wherein the insert includes a portion free of the slit, the portion extending from the front end towards the rear end, the flow passage defined between the portion of the insert and the tip of the insert.

10. The stator of claim 1, comprising a braze joint at the at least one location where the tip is secured to the insert.

11. A turbine section, comprising;
stators and rotors in fluid flow communication with the stators, a stator of the stators having:

vanes circumferentially distributed around a central axis, a vane of the vanes extending along a spanwise axis from a first end to a second end, the vane defining an internal passage extending from the first end to the second end, an insert received within the internal passage of the vane, the insert defining a cavity for receiving cooling air, the insert defining impingement cooling apertures in fluid communication with the cavity and facing an inner face of the vane, and a splitter plate secured within the cavity of the insert between the first end and the second end and being transverse to the spanwise axis, the splitter plate having a base abutting the insert and a tip protruding from the base, the tip defining:

- a free portion free of abutment with the insert to define a flow passage between the free portion and the insert, the flow passage fluidly connecting a first section of the cavity located on a first side of the splitter plate to a second section of the cavity located on a second side of the splitter plate, and
- an attached portion having a perimeter secured to the insert at at least one location.

12. The turbine section of claim 11, wherein the tip extends from a proximal end at the base to a distal end, the attached portion corresponding to the distal end.

13. The turbine section of claim 12, wherein the insert includes a rear end proximate a trailing edge of the vane and a fore end, the attached portion secured to the fore end.

14. The turbine section of claim 12, wherein the flow passage includes two flow passages.

15. The turbine section of claim 14, wherein the two flow passages are located on opposite sides of the tip.

16. The turbine section of claim 11, wherein the splitter plate is free of a cantilevered section.

17. The turbine section of claim 11, wherein a perimeter of the base is secured to the insert via a braze joint.

18. The turbine section of claim 17, wherein the insert includes a rear end proximate a trailing edge of the vane and a fore end, the insert defining a slit extending from the rear end toward a front end of the insert, the splitter plate received within the slit.

19. The turbine section of claim 18, wherein the insert includes a portions free of the slit, the portion extending from the front end of the insert towards the rear end, the flow passage defined between the portion of the insert and the tip of the insert.

20. The turbine section of claim 11, comprising a braze joint between the attached portion and the insert at the at least one location.

* * * * *